United States Patent

Gutman

[11] 3,877,401
[45] Apr. 15, 1975

[54] SOIL INJECTION MEANS
[75] Inventor: Nathan Gutman, Loudonville, N.Y.
[73] Assignee: Caterpillar Tractor Company, Peoria, Ill.
[22] Filed: Dec. 17, 1973
[21] Appl. No.: 424,960

[52] U.S. Cl..................................... 111/7; 172/706
[51] Int. Cl............................................. A01c 23/02
[58] Field of Search..................... 172/7, 6, 7.1–7.4, 172/699, 700, 195, 196, 199, 200, 705, 707, 706

[56] References Cited
UNITED STATES PATENTS

| | | | |
|---|---|---|---|
| 1,964,064 | 6/1934 | Karshner | 111/7.1 |
| 2,964,863 | 12/1960 | Shepherd | 172/196 X |
| 2,988,026 | 6/1961 | Heckathorn | 111/7 |
| 3,003,664 | 10/1961 | Cave | 111/7 X |
| 3,307,289 | 3/1967 | Lemm | 111/7 X |
| 3,413,940 | 12/1968 | Vissers | 111/7 |
| 3,602,166 | 8/1971 | Peterson | 111/6 |
| 3,606,848 | 9/1971 | Dobbs et al | 111/7 |

Primary Examiner—Stephen C. Pellegrino
Attorney, Agent, or Firm—Phillips, Moore, Weissenberger, Lempio & Strabala

[57] ABSTRACT

An earthworking vehicle is provided with readily mountable and demountable injection means for injecting fluid mixtures of chemical soil stabilizing agents or other soil-treating agents beneath the soil surface. The injection means include a plurality of hollow, soil-penetrating injector members mounted on a horizontal adapter beam affixed to the earthworking vehicle. The injector members are rigidly fixed against lateral displacement, but are spring-biased by a biasing spring against upward vertical movement to permit limited vertical displacement in response to encounters with a predetermined resistance in the soil sufficient to overcome the downward load of the biasing spring. The injector members are provided with wear-resistant tips and shielded discharge ports for discharging fluid supplied to the injector members beneath the soil surface. The earthworking vehicle may be provided with soil scarifying, injection means protection, or other means appropriately located to impart these additional functions to the vehicle.

9 Claims, 2 Drawing Figures

SOIL INJECTION MEANS

BACKGROUND OF THE INVENTION

This invention relates to soil treatment and, more particularly, to improved means for impregnating soil with a treating agent.

At present, clay and other soft soils are typically chemically stabilized prior to surfacing with asphalt or similar material with a lime slurry coated on a scarified or otherwise fragmented soil to facilitate penetration of the slurry to the prescribed depth as rapidly and effectively as possible. Since sufficient interaction of the soil and slurry is desirable for satisfactory results, earthworking equipment such as motor graders and rotary hoes are conventionally employed to admix the reactants to obtain a finely granulated material which facilitates absorption of the slurry and reaction of the slurry and soil. After such soil conditioning, the admixture is normally spread in a uniformly thick layer and compacted to afford maximum density, chemical reaction, and a smooth, durable surface.

This and similar soil stabilizing procedures have proved to be time-consuming and expensive, and it has been found desirable to provide means for impregnating the soil with chemical stabilizing agents which eliminates present scarifying and multiple-pass mix systems.

Although other prior art means for introducing chemical solutions into soil are known, such as those described in U.S. Pat. No. 2,713,299 to Shager et al.; 2,874,656 to Bennett; and 3,294,181 to Binder, these means are typically useful for introducing fertilizer solutions into agricultural soil and are thus designed for use under conditions substantially different from those encountered during soil stabilization, and are further designed to obtain substantially different results in many cases. Other prior art means for obtaining soil fluid contact are exemplified by U.S. Pat. No. 3,685,592 to Frisbee, which does not, however, promote soil/fluid interaction.

SUMMARY AND OBJECTS OF THE INVENTION

The invention provides means for impregnating soil or other substrate with a fluid treating agent comprising injection means for injecting the treating agent beneath the soil surface. The injection means include a plurality of hollow injector members secured to a horizontal beam which is affixed to an element of a suitable earthworking vehicle, such as the bulldozer of a crawler tractor. The injector members are supplied with fluid under sufficient pressure to deliver the required volume of fluid to the soil through fluid discharge ports provided at the distal end of the injector members. The injector members are provided with a wear-resistant tip which is preferably conical in shape to facilitate entry into the soil, and, preferably, the fluid discharge ports are located within a circumferential groove disposed rearward of the tip of the injector member to reduce the possibility of clogging the ports. The injector members are secured against lateral displacement, but are spring-biased in a vertical direction to permit limited upward vertical displacement in the event sufficient resistance is encountered during movement of the members through the soil. Preferably, the vehicle on which the injection means are mounted is equipped with means for scarifying the soil and protecting the injection means during operation in erratic, troublesome soils.

It is therefore an object of this invention to provide means for impregnating soil or other substrate material with a fluid treating agent which inexpensively and simply accomplishes effective substrate impregnation.

It is another object of this invention to provide means for injecting fluid mixtures of chemical soil stabilizers into soil which effectively promote soil penetration.

It is a further object of this invention to provide means for injecting a chemical soil stabilizer in fluid mixture into soil which effectively impregnate the soil with the fluid mixture and eliminate the necessity of scarifying the soil and the employment of multiple-pass mixing techniques.

Other objects and advantages of this invention will be apparent to those skilled in the art from the following description and drawings.

DETAILED DESCRIPTION

Figure 1:
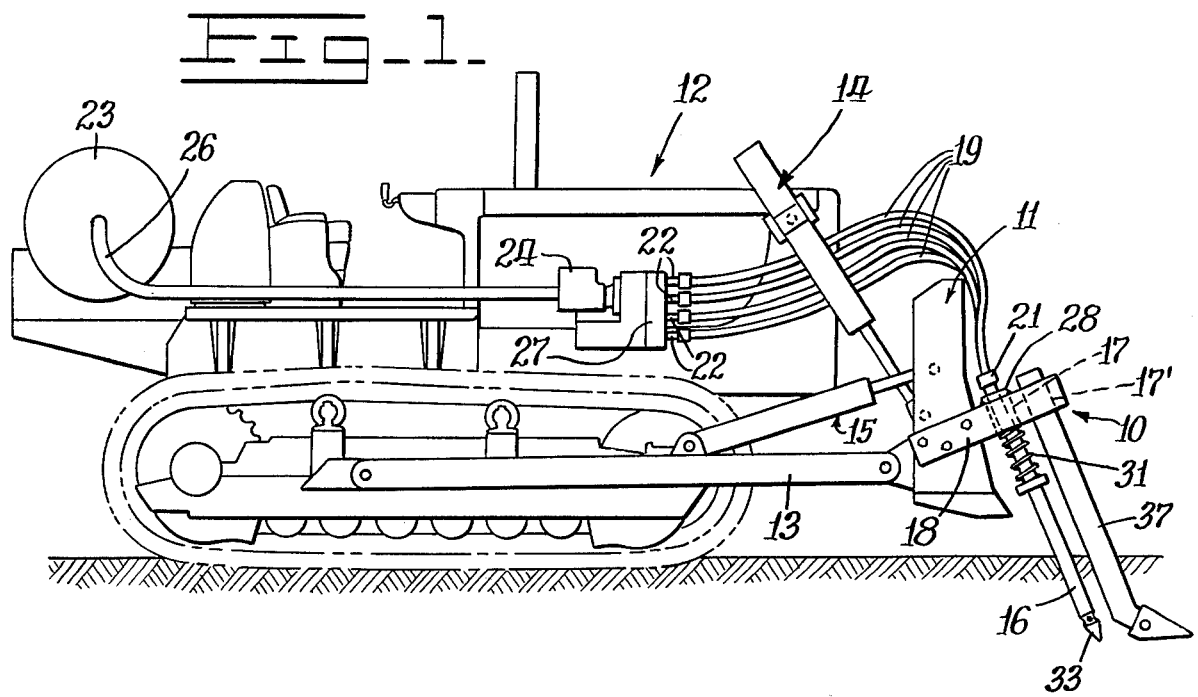
FIG. 1 is a side-elevation view of an earthworking vehicle equipped with the injecting means of this invention.
Figure 2:
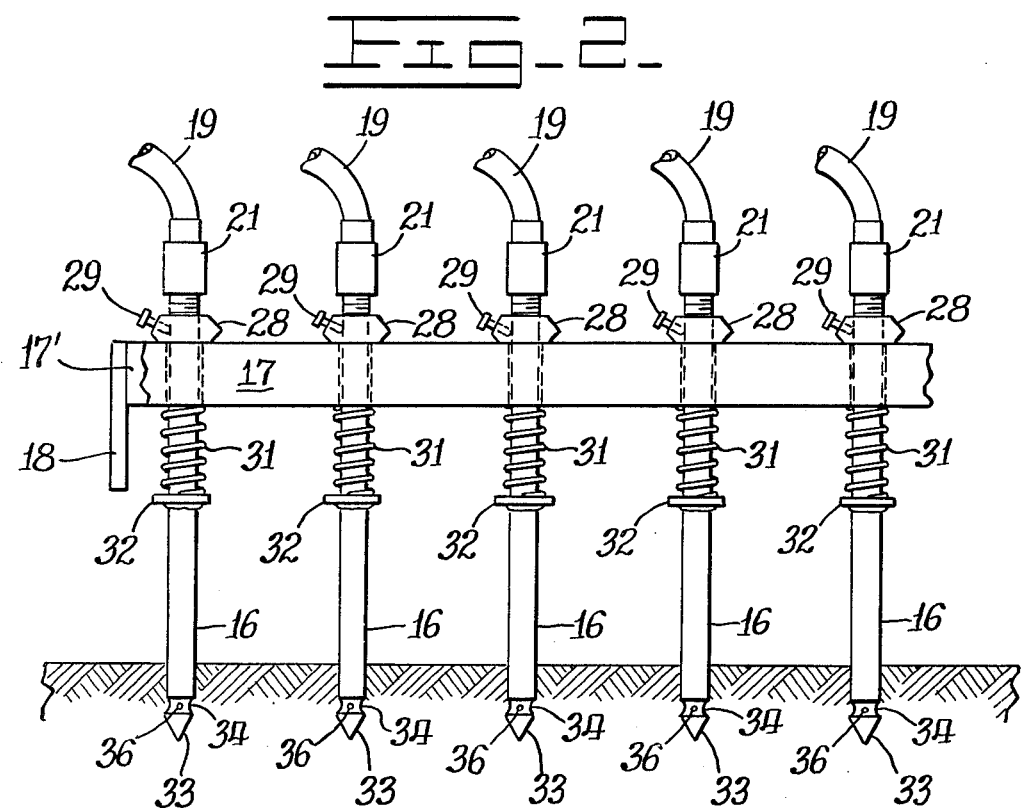
FIG. 2 is an enlarged front view of the injection means of this invention.

With particular reference to FIG. 1, the injection means of this invention are generally indicated at 10, and shown for purpose of illustration mounted on a blade 11 operatively attached to a crawler tractor 12 by conventional means including a pair of push arms, one of which is shown at 13, a pair of hydraulic jacks, one of which is shown at 14, and tilt means 15 for tilting the blade 11. The injection means 10 includes a plurality of elongated hollow injector members 16 removably secured at fixed lateral intervals within a horizontal adapter beam 17 which is affixed to the blade 11 as by a pair of side brackets, one of which is shown at 18, as best seen in FIG. 2. Slurry or other fluid is supplied to each of the injector members 16 by a fluid communication hose 19 attached at one end thereof to the upper end of the injector member by a fitting 21, and attached at the opposite end thereof to one of a plurality of main slurry supply lines 22 as required to furnish slurry to each injector member. The main slurry supply lines 22 are charged with slurry by a pump 24 which draws slurry from a slurry reservoir 23 carried (as shown) or towed (not shown) by the tractor 12 and pumps it through a primary line 26 and a manifold 27 to the main slurry supply lines 22.

As best shown in FIG. 2, each of the injector members 16 of the injection means 10 are removably secured within close-fitting bores in the beam 11 by a detachable collar 28 slidably fitted around members 16. The collars, which are releasably secured to the injector member 16 by bolt means 29, however, permits a limited amount of vertical movement of the injector members 16 which under normal operating conditions is prevented by the downward bias of springs 31, one of which is coaxially disposed about each injector member and seated against a spring seat 32 coaxially disposed about each injector member at about and fixed to the mid-portion thereof. The springs 31 are pre-loaded so that in the event a pre-determined amount of resistance is encountered by an injector member as it moves through the soil, the injector member will overcome the load of the springs and be displaced upwards to avoid the obstacle, thereby reducing the probability of damaging this member.

The injector members 16 are each provided with a wear-resistant wear tip 33, preferably conical in form and of hardened steel, which is separated from the main body of the injector member by a relief or circumferential groove 34 provided with a fluid discharge port 36. The conical shape of the wear tip 33 and the adjacent groove 34 shield the discharge port 36 from the substrate material, and tend to reduce clogging of the port as the injection means 10 moves through the soil.

The number of injector members 16 employed may vary according to the specific application of the injector means 10. The injector members are preferably positioned so that they move through the soil at an angle to the plane of the soil surface, as illustrated in FIG. 1. Further, the injector members 16 may be optionally shielded as by conventional heavy-duty front-mounted scarifier shanks 37 shown mounted on a cross-beam 17' similar to cross beam 17 in FIG. 1, if erratic troublesome soil conditions exist.

The slurry supplied to the injection means 10 is preferably pre-mixed to the proper consistancy and quickly used to avoid the necessity of settling or agitation of the mixture in the reservoir 23 to obtain maximum dissolution and maximum distribution and soil reaction. The volumetric input of slurry into the soil is conveniently regulated by a suitable valve (not shown) having controls near the operator for regulating the capacity of the primary line 26. Typically, chemical stabilization of soils with, for example, lime slurry, requires an amount of slurry of about 6% by volume of the soil to be treated, for satisfactory results, and suitable pump means are provided for delivery of the required volume of slurry during stabilization operations. Other soil-treating operations, however, may require a greater or lesser volume of the soil-treating fluid for delivery to the soil, and it may be desirable in these other applications to increase or decrease the volumetric capacity and/or operating speed of the pump 24 to obtain the desired volumetric input of soil-treating fluid. The size and number of the discharge ports 36 may also be varied as necessary to obtain the desired fluid volume input into the soil.

The depth of penetration of the injector members 16 into the soil may be controlled by the jacks 14 and the conventional existing vehicle controls; by this means depth penetration of the injector members on the tractor 12 may be controlled as desired up to a maximum penetration of about 24 inches.

The invention further provides safety features which decrease any potential safety hazard to the operator of the vehicle deriving from the presence of pressurized elements. Since all the pressure for forcing the slurry or other soil-treating fluid into the soil is created by the pump 24, this pump and the other pressurized elements are located remotely from the operator. There is thus little danger to the operator from accidental high pressure leaks or ruptures which might be incurred during operation.

Numerous modifications of the invention for use in specific applications are contemplated. For example, the beam 17 and injector members 16 can be made in various configurations for either light or heavy-duty work. Means other than the scarifier shank 37 may be employed where suitable to protect the injector members 16, and further, may include means for providing the vehicle with additional functions, such as ripping asphalt topping, if desired. The injector members 16 and their supporting structures are readily adaptable to earthworking equipment provided with production bulldozer blades, rippers mounted on the rear of the vehicle, and the like, with minimum change and down time, while their use in conjunction with such equipment provides more effective slurry injection due to the relatively high support and tractive capabilities of this equipment. Also, since readily obtainable and mounted pumps, reservoirs and hoses may be used with the injection means 10 equipping the earthworking vehicle for soil stabilization work is a relatively simple procedure; additionally, these elements may generally be left attached to the vehicle without inconvenience when the injection means 10 are removed to restore the normal earthworking function to the vehicle, further reducing down time.

Although the injection means 10 of this invention has been described with particular reference to employment as a means for injecting slurry into the soil, this embodiment of the invention has been described merely for purpose of illustration, without intention of limiting the invention thereto. Other uses of the invention will be apparent to those skilled in the art to which it pertains, including the use of the invention to inject other liquid mixtures or solutions into the soil or other suitable substrate. Further, equivalent elements may be substituted for those described in the illustrated embodiment without departing from the spirit or scope of the invention, and no limitation on such equivalent variations or modifications is intended, except as determined by the scope of the appended claims.

What is claimed is:

1. Injection means for injecting soil treating fluid beneath the surface of the soil, said injection means including a plurality of straight, elongated, hollow injector members, each having at a distal end thereof a fluid discharge port and being connected at the opposite end thereof to a soil treating fluid supply source, said injector members being slidably mounted with respect to the beam at fixed, lateral intervals on a horizontal beam by mounting means which restrain lateral movement of the injector members and which permit limited vertical movement of said members in response to the application of a predetermined force in an upwards direction to said members, said mounting means including separate spring means on each of said injector members for spring-biasing each of said injector members in a downward direction to restrain said members against upward vertical displacement with respect to said horizontal beam until sufficient force is applied to said members in an upward vertical direction to overcome the force of said spring means.

2. The invention of claim 1, wherein said injector members are provided with a conical wear-resistant tip at the trailing end thereof, and each said fluid discharge ports are located in a groove formed adjacent to the base of said conical tip.

3. The invention of claim 2 wherein said soil treating fluid is a lime slurry.

4. The invention of claim 3, wherein said earthworking vehicle is a crawler tractor, and said horizontal beam is attached to a blade affixed to said tractor.

5. The invention of claim 3, wherein said earthworking vehicle includes soil scarifying means positioned to precede said injection means during forward operation of said vehicle.

6. The invention of claim 5, wherein said scarifying means is a scarifier shank mounted ahead of said injection means.

7. The invention of claim 1 wherein said mounting means comprise bores in said horizontal beam through which said injector members are slidably fitted.

8. The invention of claim 7 wherein said mounting means further comprise a spring seat fixed to each said injector member and wherein said spring means comprise a spring on each injector member intermediate said horizontal beam and said spring seat.

9. The invention of claim 8 wherein said mounting means further comprises a detachable collar slidably fitted around each said injector member and means releasably securing said collar to each said injector member.

* * * * *

UNITED STATES PATENT OFFICE
CERTIFICATE OF CORRECTION

PATENT NO. : 3,877,401
DATED : April 15, 1975
INVENTOR(S) : Nathan Gutman

It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-second Day of July 1975

[SEAL]

Attest:

RUTH C. MASON
Attesting Officer

C. MARSHALL DANN
Commissioner of Patents and Trademarks